US006170871B1

(12) United States Patent
Goestenkors et al.

(10) Patent No.: US 6,170,871 B1
(45) Date of Patent: Jan. 9, 2001

(54) INFLATABLE TRIM PANEL ASSEMBLY FOR SAFETY RESTRAINT SYSTEMS

(75) Inventors: Gregory N. Goestenkors, Waterford; Philip A. Shishmian, Mackinaw City, both of MI (US)

(73) Assignee: Breed Automotive Technology, Inc., Lakeland, FL (US)

( * ) Notice: Under 35 U.S.C. 154(b), the term of this patent shall be extended for 0 days.

(21) Appl. No.: 09/103,867

(22) Filed: Jun. 24, 1998

(51) Int. Cl.[7] .................................................. B60R 21/16
(52) U.S. Cl. .................................... 280/743.1; 280/743.2; 280/753
(58) Field of Search ............................ 280/728.2, 728.3, 280/729, 730.1, 732, 743.1, 743.2, 751, 752, 753; 296/189

(56) References Cited

U.S. PATENT DOCUMENTS

| 3,799,578 | * | 3/1974 | Hamasaki et al. | 280/730.1 |
| 5,382,051 |   | 1/1995 | Glance . | |
| 5,447,326 | * | 9/1995 | Laske et al. | 280/728.3 |
| 5,454,588 | * | 10/1995 | Rose | 280/728.2 |
| 5,501,488 | * | 3/1996 | Saderholm et al. | 280/739 |
| 5,544,913 | * | 8/1996 | Yamanishi et al. | 280/730.2 |
| 5,615,914 | * | 4/1997 | Galbraith et al. | 280/743.1 |
| 5,718,449 | * | 2/1998 | Numazawa et al. | 280/730.2 |
| 5,816,613 |   | 10/1998 | Specht et al. . | |
| 5,839,756 | * | 11/1998 | Schenck et al. | 280/743.1 |
| 5,895,069 | * | 4/1999 | Heilig et al. | 280/730.1 |
| 5,904,370 | * | 5/1999 | Steiner et al. | 280/743.1 |
| 5,992,877 | * | 11/1999 | Gray | 280/730.1 |
| 5,997,034 | * | 12/1999 | Hirai et al. | 280/743.1 |

FOREIGN PATENT DOCUMENTS 2-306849 * 11/1993 (JP) .
2267065 * 11/1993 (GB) .

* cited by examiner

Primary Examiner—Eric Culbreth
Assistant Examiner—David R. Dunn
(74) Attorney, Agent, or Firm—Markell Seitzman

(57) ABSTRACT

An inflatable trim panel assembly (20) operable to provide a gas-filled cushion for protecting the vehicle occupant in an accident situation. The trim panel assembly (20) includes a support member (22), an elastic skin (24) attached to the periphery of the support member (22), and tethers (28) that are secured between the elastic skin (24) and the support member (22). The trim panel assembly (20) also includes an inflator (26) which, upon activation, supplies gas to the sealed area (30) between the elastic skin (24) and the support member (22) causing expansion of the elastic skin (24) and formation of an energy absorbing safety restraint cushion. The tethers (28) shape the elastic skin (24) so that the body of the vehicle occupant may be properly directed into the location for optimum safety restraint.

11 Claims, 4 Drawing Sheets

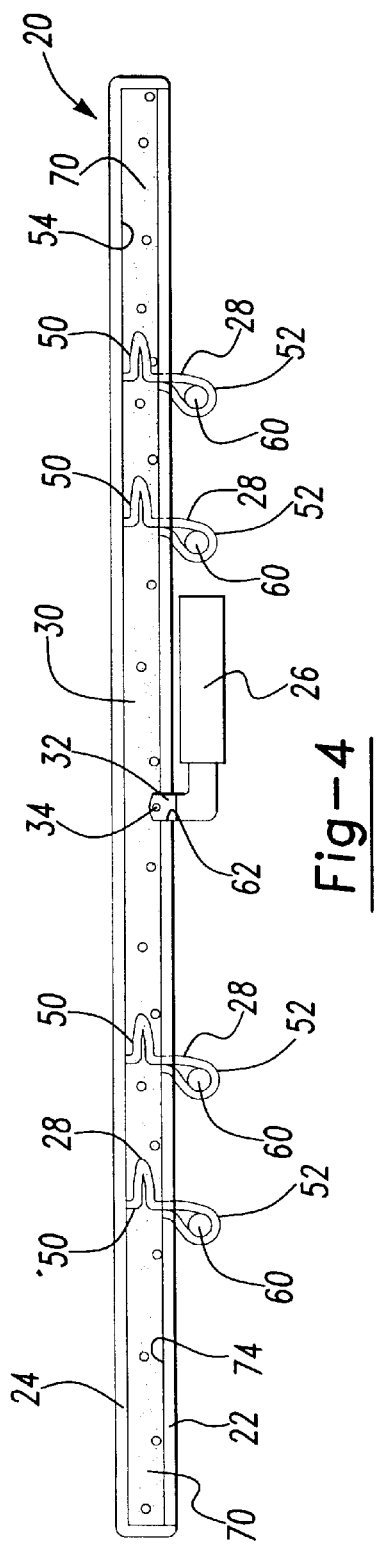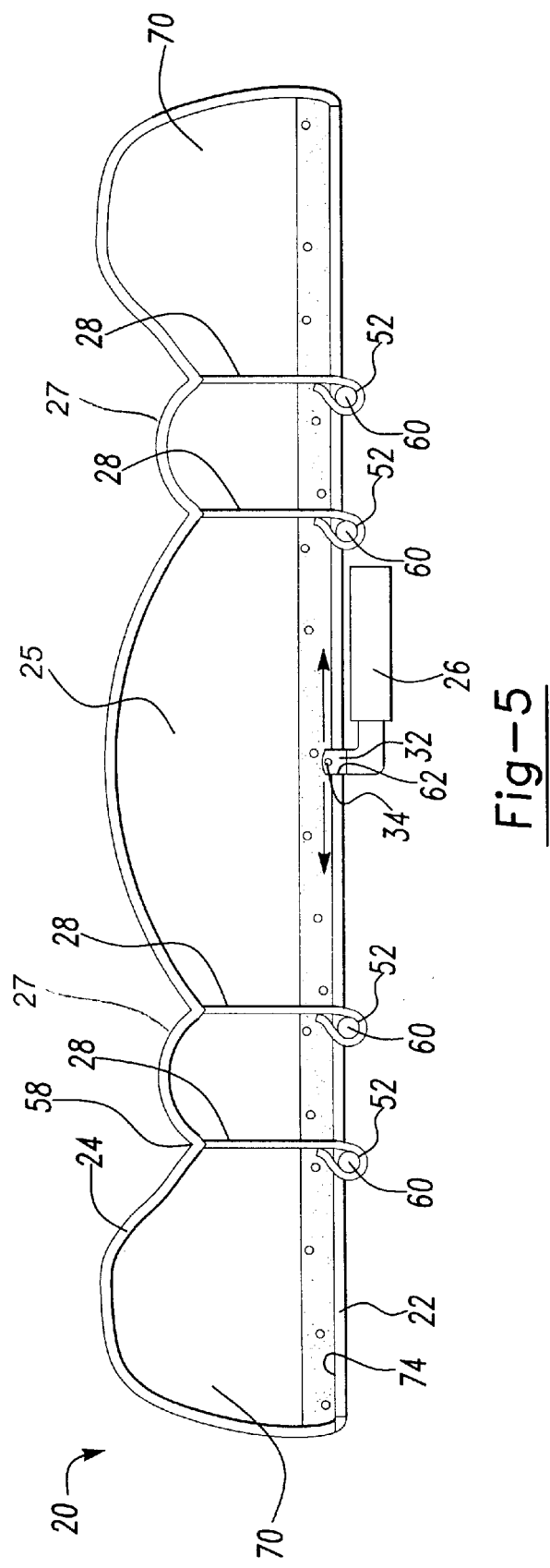

INFLATABLE TRIM PANEL ASSEMBLY FOR SAFETY RESTRAINT SYSTEMS

BACKGROUND AND SUMMARY OF THE INVENTION

The present invention relates generally to vehicle air bag restraint systems and, more specifically, to an inflatable trim panel assembly for use in a vehicular air bag restraint system.

In the automotive industry, air bag restraint devices have become standard equipment in most passenger vehicles. Most commonly, the air bag restraint device is mounted in the dashboard and/or the steering wheel assembly of the motor vehicle. While the particular location of such air bag restraint devices may vary, each is typically designed for installation as a modular assembly. A conventional air bag module contains an inflator, a folded air bag and a deployment housing within which the air bag and the inflator are mounted. The deployment housing is typically secured to a rigid support structure within the steering wheel assembly, dashboard, door panel, or other air bag location.

Traditionally, most air bag restraint devices are mounted in a position to protect the vehicle occupant's upper torso and head when deployed in response to an accident situation. As is known, the use of such traditional air bag restraint devices, particularly in conjunction with the use of seat belts, has proven to reduce the severity of injuries and increase the survival rate of accidents. However, because conventional steering wheel and dashboard mounted air bag restraint devices are primarily designed to protect the uppermost part of the occupant's body, their use, without more, may leave the lower extremities of the occupant's body vulnerable to potential injuries.

It is also known in the art to deploy the air bag through a hinged door. Upon deployment of a low-mounted air bag assembly during an accident situation, the hinged door swings outward to release the air bag. A problem may arise if the impact caused by an accident thrusts the vehicle occupant into contact with the exposed door, potentially causing injury to the occupant's lower extremities. Thus, the need exists to develop alternative air bag restraint devices that advance the art and overcome the shortcomings associated with conventional air bag restraint devices.

The present invention is directed to a trim panel assembly having means for providing a gasfilled cushion for protecting the vehicle occupant during an accident situation. The trim panel assembly of the present invention finds particular utility in providing lower extremity safety restraint for vehicle occupants by providing an inflated knee bolster. When used as a knee bolster, the invention achieves optimum safety restraint by directing the knees of the vehicle occupant to a desired location for such restraint. In this regard, an expandable skin of the trim panel assembly can be inflated to form an energy absorbing gas-filled cushion having optional internal tethers that shape the cushion so as to guide the vehicle occupant's knees to a desired location for optimum safety restraint. As can be appreciated the present invention is not limited to use as a knee bolster. The concept of using an inflatable trim or skin can be incorporated into an inflatable door panel trim or an inflatable instrument panel trim.

The inflatable trim panel assembly of the present invention is advantageous over traditional air bag restraint devices in that it reduces material and assembly costs in view of the dual function of the expandable skin. Namely, the skin normally serves as a cover layer for a decorative trim panel and also serves as an inflatable cushion when expanded in response to a vehicular collision. The use of the expandable skin as contemplated by the present invention further reduces the material and assembly costs by eliminating the need for a folded air bag and a hinged door assembly through which the air bag is deployed.

In addition to the expandable skin, the trim panel assembly of the present invention includes a support member and a source of inflation gas, such as, for example, a pyrotechnic inflator. The support member can be a separate structure or an existing portion of the vehicle passenger compartment. The skin covers an associated energy absorbing pad and at least partially covers the support member and attaches to its peripheral surface. Upon activation, the inflator fills the area between the skin and the support member with pressurized gas for expanding the elastic skin to define a gas-filled cushion. As a further option, tethers are secured between the skin and the support member. The tethers are used to define the shape of the gas-filled cushion formed by the inflated skin. One end of each of the tethers is secured to a non-exposed surface of the expandable skin by sewing, ultrasonic welding, or the like. The other end of the tethers is secured directly or indirectly to the support member.

In response to an accident situation, a crash detection sensor sends a signal to the vehicle's crash management controller which, in turn, sends a signal to activate the inflator. Activation of the inflator fills the area between the elastic skin and the support member with pressurized gas, thereby causing the elastic skin to expand. Preferably, the gas is discharged through a nozzle in communication with the inflator. The gas discharged from discharge ports in the nozzle initially flows in a direction generally parallel to the uninflated skin, thereby allowing uniform expansion of the elastic skin. Radial flow can also be used to tailor the inflation characteristics of the skin.

In one alternative embodiment, the present invention contemplates the optional use of a foam material between the elastic skin and the support member. The foam material acts as a padding to dampen contact between the occupant and the support member.

BRIEF DESCRIPTION OF THE DRAWINGS

FIG. 4 is a sectional view of the inflatable trim panel assembly shown in FIG. 1;

FIG. 5 is a sectional view of the inflatable trim panel assembly shown in FIG. 2;

DETAILED DESCRIPTION OF THE PREFERRED EMBODIMENT

Figure 1:
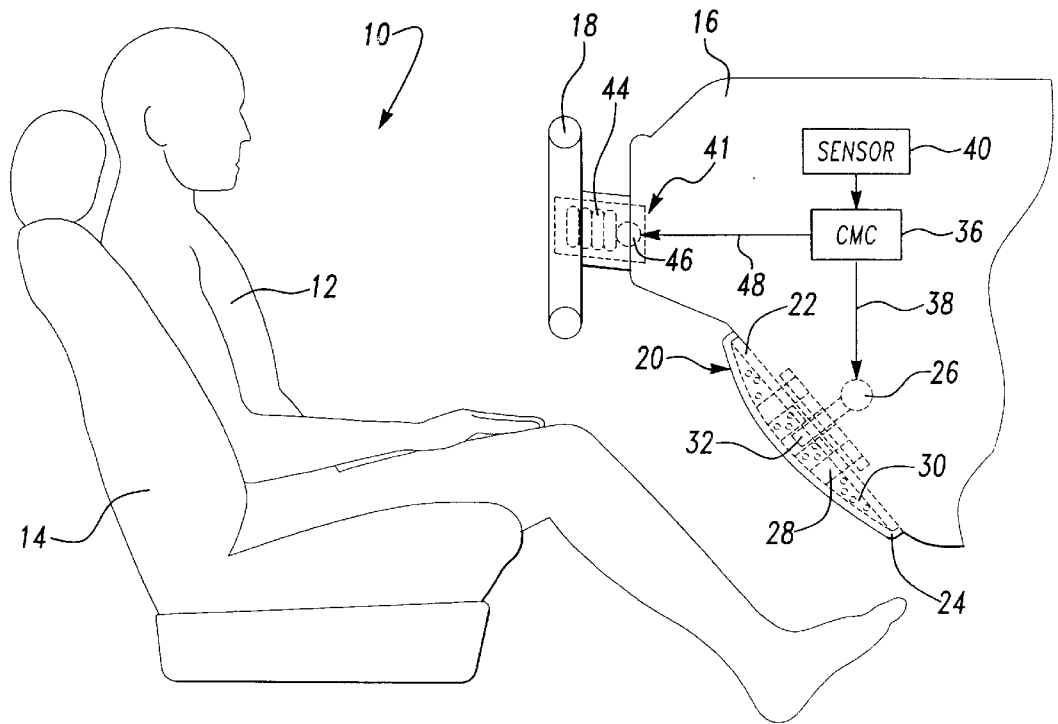
FIG. 1 is an environmental view of the interior of a vehicle showing a preferred embodiment of an inflatable trim panel assembly mounted below the steering wheel in a non-deployed state.
Figure 2:
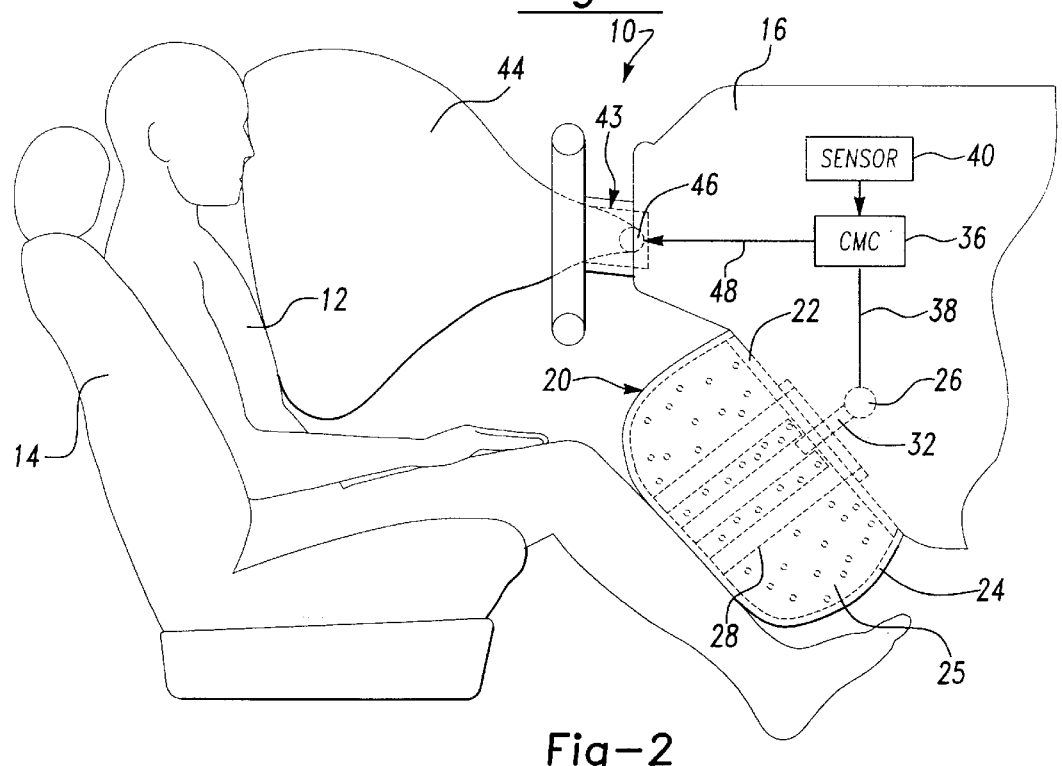
FIG. 2 is another environmental view of the interior of the vehicle showing the inflatable trim panel assembly in a deployed state.

In general, the present invention is directed to a trim panel assembly having an elastic skin. The elastic skin can be expanded in response to activation of an inflator to define a gas-filled cushion. While the following description is directed to a system which comprises use of the inflatable trim panel assembly in conjunction with another air bag restraint device, it will be understood that the present invention is applicable for use in motor vehicles as a stand-alone inflatable safety restraint device. With reference to FIGS. 1 and 2, a portion of an exemplary passenger compartment 10 of a motor vehicle is shown with a seat occupant 12 seated in a driver-side seat assembly 14 in proximity to a dashboard (also referred to as an instrument panel) structure 16 and a steering wheel 18. A trim panel assembly 20 is mounted in a lower portion of dashboard structure 16. In general, trim panel assembly 20 includes a support member 22, an expandable trim cover material, hereinafter referred to as elastic skin 24, and an inflator or other source of hot or cold inflation gas 26 which can be mounted adjacent to or behind the trim panel assembly or remote thereto. The material used as the elastic trim must be strong and flexible. Additionally, the surface of the material of the skin 24 should be capable of being embossed so that its surface finish blends in with the surrounding, adjacent trim components of the vehicle. Depending upon the choice of skin material, it might be desirable to optionally include a plurality of optional tethers 28. As can be appreciated, the tethers 28 will define the inflated shape of the inflated skin 24. Without a tether the skin 24 will inflate as a balloon. The tethers also prevent the skin material from rupturing. Depending upon the choice of skin material 24 and the desired inflated shape of the skin 24, the tethers can be eliminated. The tethers 28 can be made of a stretchable material or a less elastic material which can be folded at middle section 50 (see FIG. 4) and which unfolds to permit the skin 24 to expand. As mentioned above, activation of inflator 26 causes elastic skin 24 to expand or stretch to define a gas-filled cushion 25 (SEE FIG. 5) for protectively restraining the forward motion of the occupant's knees and legs and inhibits forcible contact of the occupant's legs and dashboard structure 16. Those skilled in the art will appreciate that trim panel assembly 20 can also be mounted in the dashboard structure 16 in proximity to a passenger-side seat assembly and/or can be mounted in other on-board vehicle structures such as, for example, the side door panels or the overhead trim structure to provide gas-filled cushions wherever required.

Support member 22 is a preferably rigid or semi-rigid mounting plate that is adapted to be fixedly secured to dashboard structure 16 for securing trim panel assembly 20 thereto. Elastic skin 24 is secured along the entire periphery of support member 22 so as to define a sealed volume 30 therebetween. Elastic skin 24 is secured to support member 22 via traditional bonding or sealing techniques such as adhesives, sewing, staples, and ultrasonic welding or combination thereof. Elastic skin 24 is preferably made from thermoplastic urethane (TPU) or other highly elastic, low, preferably non-porous material with high shear and tensile strengths. However, elastic skin 24 can be made from any suitable material capable of expanding without rupturing during expansion or contact with occupant 12. As mentioned, elastic skin 24 has an outer surface providing a decorative trim surface which aesthetically blends with the surrounding dashboard structure 16. The skin 24 is secured about and envelops a padding material 70 (see FIG. 4) such as a porous urethane foam which may be a pre-formed insert or poured or blown in between the skin 24 and the support member 20 through an opening (not shown) in the support member.

Inflator 26 includes or is coupled to a nozzle 32 which communicates inflation gas into sealed volume 30. The nozzle is located sufficiently below the top of the padding material 70 to prevent any direct impact with a part of the occupant. The nozzle has one or more exhaust ports 34 (see FIGS. 3 and 4). For example, the nozzle may be positioned so that its exit ports are adjacent the upper surface of the support plate or within the padding material 70 or above the surface of the padding material at a location remote from the impact of the occupant. As is conventional, the inflator 26 includes one or more quantities of a pyrotechnic material and an igniter, squib, or equivalent device which causes the pyrotechnic material burn to produce inflation gas. The squib is in electrical communication with the vehicle's crash management controller (CMC) 36, such as is indicated by lead line 38 as shown in FIGS. 1 and 2. In the context of the present invention the type of "inflator" used is of no significance. The inflator 26 can be any of a solid pyrotechnic, liquid, hybrid inflator or other type of inflator. The inflator 26 may also include a canister of cold, compressed gas having a control valve which is opened to communicate the gas to the nozzle 32. Further, the inflator 26 can be dedicated to inflate only the skin 24 or shared via a common manifold with other inflatable air bags such as a side impact, driver or passenger air bag. When the vehicle's onboard crash detection sensor(s) 40 detect a vehicular crash, CMC 36 sends an electric control signal to the igniter to activate inflator 26 or otherwise communicate inflation gas thereto. As a result, inflator 26 generates or communicates a high pressure gas which is directed through nozzle exhaust ports 34 into sealed volume 30 (directly against the skin or indirectly through the padding material), whereby elastic skin 24 is caused to expand to produce a gas-filled cushion 25 which extends into passenger compartment 10 of the motor vehicle. Thus, FIG. 1 illustrates trim panel assembly 20 in a "non-deployed" condition prior to activation of inflator 26. FIG. 1 also illustrates a non-deployed traditional air bag restraint assembly 41, to additionally protect the occupant, mounted in steering wheel 18 with a folded air bag 44 and an inflator 46 also in electrical communication with CMC 36, as shown by lead line 48. As can be appreciated the restraint 44 can also be located to protect the passenger of the vehicle. As previously mentioned, one inflation source can be substituted for the two separate inflators 26 and 46. Separate valve elements (not shown) can be used if it is not desired to inflate the skin 24 and the air bag 42 at the same time. In contrast, FIG. 2 illustrates trim panel assembly 20 in a "deployed" condition after activation of inflator 26 and illustrates air bag 44 deployed after activation of inflator 46. In the particular embodiment shown, trim panel assembly 20 is mounted to act as a low-mount air bag restraint device which provides a gas-filled knee bolster upon deployment.

Figure 3:
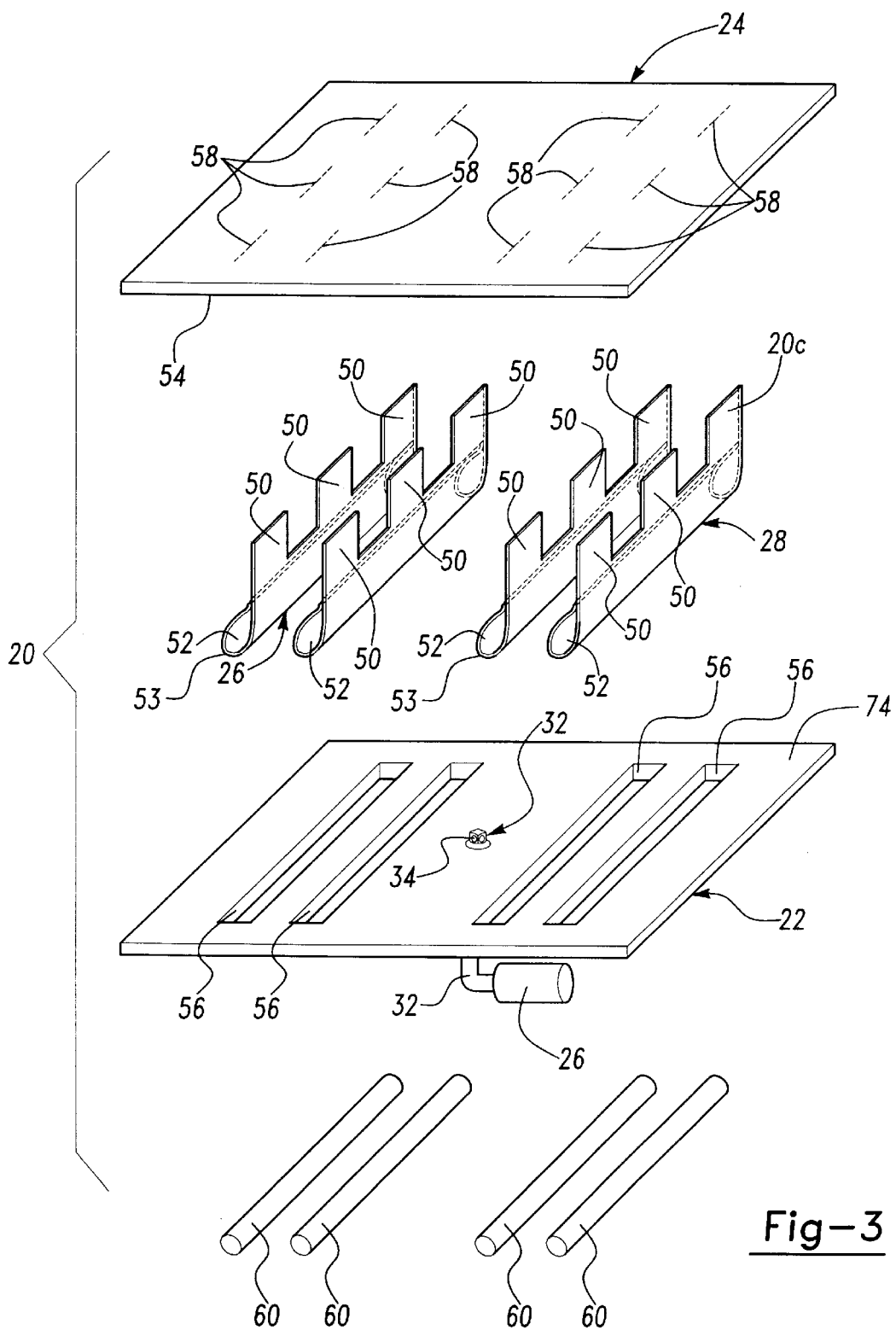
FIG. 3 is an exploded perspective view of the inflatable trim panel assembly in a pre-assembled state.
Figure 6:
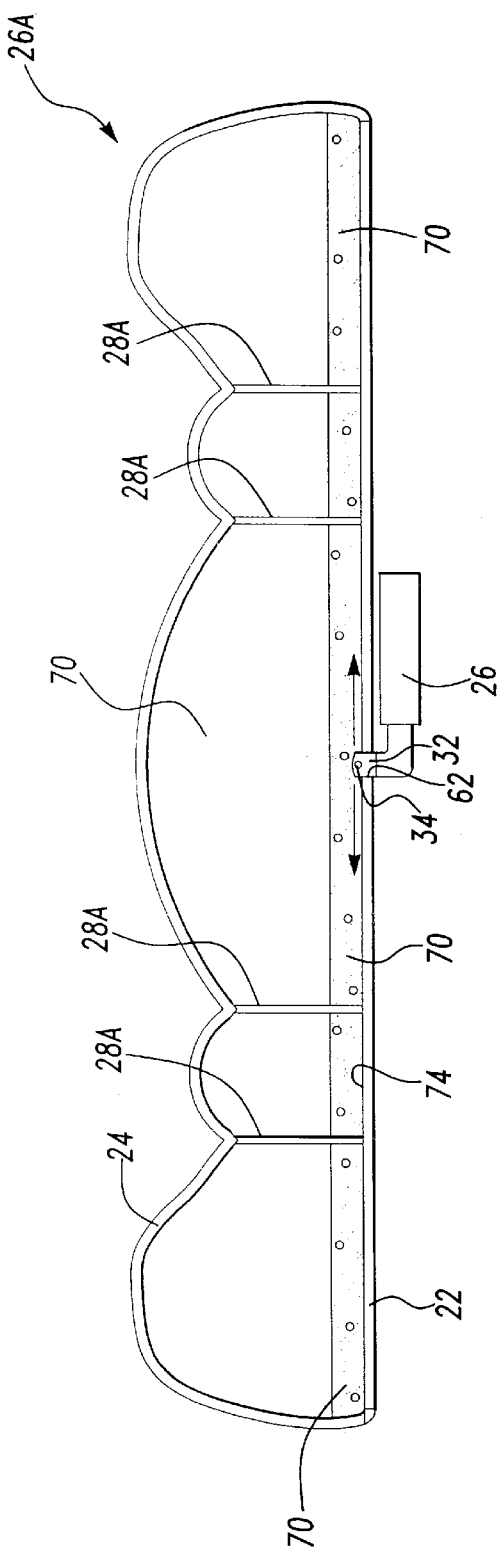
FIG. 6 is a sectional view of an alternative construction for the inflatable trim panel assembly of the present invention in a deployed state.

Referring now specifically to FIGS. 3 through 5, a first preferred construction for trim panel assembly 20 is shown in greater detail. A plurality of tethers 28 are secured between elastic skin 24 and support member 22. Each tether 28, at its top, is secured to an underside or inner surface 54 (at the location designated by reference numeral 58) of elastic skin 24 and end 53, formed into a looped portion 52, is inserted through an elongated slot 56 in support member 22. Tethers 28 may be secured to the inner surface of elastic skin 24 via sewing, ultrasonic welding, or any other conventional bonding technique or may be molded as part of the elastic skin. Each of the tethers 28 includes a middle section 50 that may be formed into a looped-over portion. A rod 60 is inserted into looped portion 52 of each tether 28 to prevent looped portion 52 from passing through elongated slot 56 in support member 22. Alternatively, each end 53 may be secured directly to the support panel 22 which is also shown in FIG. 6. As will be apparent to one skilled in the art, a seal or other air-tight fitting may be attached to support member 22 closing the respective slots 56 to prevent gas from escaping if the padding material 70 is insufficient to control the leakage therethrough.

Tethers 28 may be formed from material such as nylon, polyester, or any other woven or solid flexible unwoven material having sufficient elasticity to handle the expansion and energy absorption in an accident situation. The tethers 28 may be folded at middle section 50 especially if they are not sufficiently elastic, and are provided to shape the elastic skin 24, as it inflates, to a desired surface contour for guiding certain body portions of vehicle occupant 12 to a desired position. As an example, as shown in FIG. 5, two laterally-spaced recessed channels 27 can be formed by tethers 28 (upon expansion of skin 24) which are designed to properly guide the knees of vehicle occupant 12 to a central position to be cushioned by skin 24 in its inflated condition. As noted, it is contemplated that inflatable trim panel assembly 20 of the present invention can be used in any vehicular application in which a gas-filled cushion can be deployed for occupant restraint.

Accordingly, the tethers 28 can be used to provide the necessary shape to direct any part of the vehicle occupant's body to a proper location for restraint. It should be appreciated that elongated slots 56, and therefore rods 60 and tethers 28, may be oriented in any direction that will allow tethers 28 to shape inflated elastic skin 24 so that the desired body part of vehicle occupant 12 can be directed to the proper location for restraint.

FIGS. 4 and 5 respectively illustrate sectional views of inflatable trim panel assembly 20 in its non-deployed state prior to activation of inflator 26 and in its deployed state after such activation of inflator 26. Since support member 22 is rigidly affixed to on-board structure 16, the gas pressure discharge from inflator 26 through nozzle ports 34 causes elastic skin 24 to expand and form an energy-absorbing cushion 25. Concurrently, tethers 28 stretch and extend or unfold to shape the energy-absorbing cushion formed by elastic skin 28 to properly locate and receive the vehicle occupant's knees within the channels. Inflator 26, in the illustrated embodiment, is a cylindrical "thrust neutral" unit.

Nozzle 32 of inflator 26 extends through a central inlet aperture 62 in support member 22 and is nestled within the padding material. The nozzle 32 preferably includes at least two exhaust ports 34 through which the gas generated by inflator 26 is discharged. Preferably, the gas is radially disbursed from nozzle 32, whereby the gas flows through the padding material 70, which can typically be porous and enters sealed volume 30 thereby encouraging even gas distribution throughout which permits elastic skin 24 to expand. If the padding material is not porous or not sufficiently porous, the gas flow may fracture the padding material during inflation which would also be acceptable to permit the inflation gas to reach the skin.

Prior to deployment of inflatable trim panel assembly 20, padding material 70 acts to dampen any contact between vehicle occupant 12 and support member 22. It should be appreciated that padding material 70 may be any energy absorbing material that is also compatible with the gas composition and temperatures experienced during deployment of inflatable trim panel assembly 20.

An inflatable trim panel assembly 20A according to a second embodiment of the present invention is shown in FIG. 6. In particular, tethers 28A are similar to tethers 28 (FIG. 3) in that they are secured directly to elastic skin 24. However, the opposite end of each tether 28A is secured directly to an inner surface 74 of support member 22 via any traditional bonding technique known in the art. Tethers 28A are still adapted to shape elastic skin 24 to the desired cushion configuration, but the use of rods 60 and slots 56 in inflatable trim panel assembly 20 is eliminated.

Figure 7:
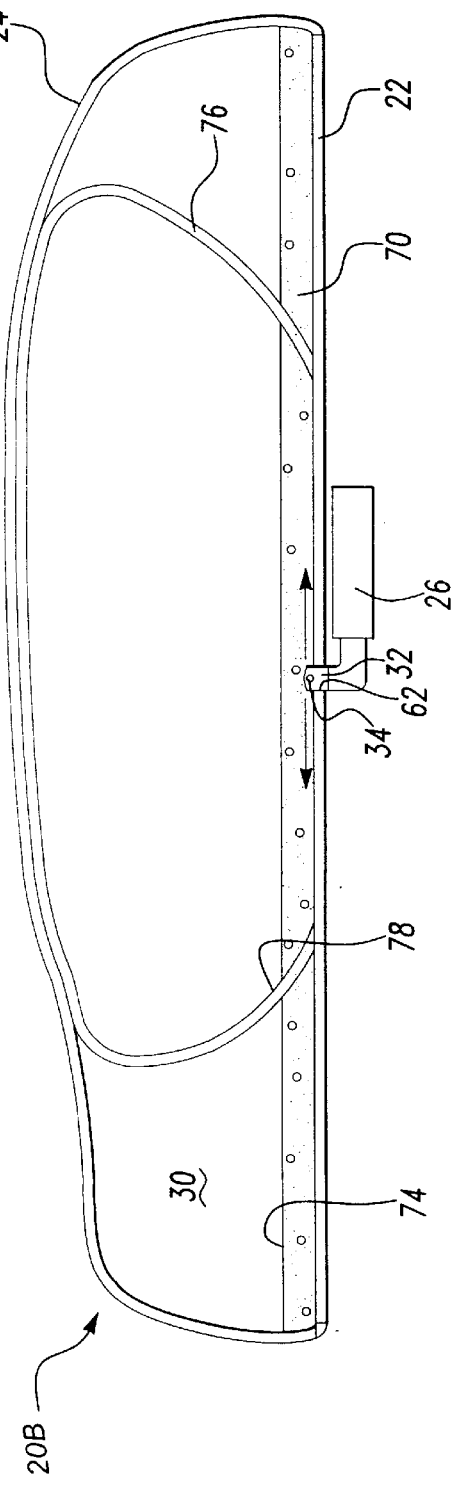
FIG. 7 is a sectional view of another alternative embodiment of the inflatable trim panel assembly of the present invention in a deployed state.

A third embodiment of inflatable trim panel assembly 20B that does not employ tethers is shown in FIG. 7. Rather than using tethers for shaping of elastic skin 24, a folded air bag 76 is located between elastic skin 24 and support member 22. Nozzle 32 of inflator 26 extends through gas inlet 62 in support member 22 and through the padding material 70 and is positioned proximate an inlet 78 in air bag 76. Inlet 78 of air bag 76 is secured to either nozzle 32 or surface 74 of support member 22 to form an airtight seal. During deployment, the pressurized gas is discharged from inflator 26 into air bag 76. This gas pressure causes air bag 76 to inflate which, in turn, causes elastic skin 24 to stretch and shape an energy absorbing cushion. The shape formed by elastic skin 24 is determined by the shape of air bag 76. Thus, tethers similar to those previously disclosed could be mounted between support member 22 and the inner surface of air bag 76. One skilled in the art will readily recognize from such discussions, that different air bag and inflator configurations may be implemented in conjunction with the inflatable trim panel assemblies of the present invention. It should also be appreciated that padding material 70 may or may not be incorporated into either of these alternative embodiments, but otherwise the structure and operation of each embodiment is as previously described.

The foregoing discussion discloses and describes merely exemplary embodiments of the present invention. One skilled in the art will readily recognize from such discussion, and from accompanying drawings and claims, that various changes, modifications and variations can be made therein without departing from the spirit and scope of the invention as defined in the following claims.

What is claimed is:

1. A trim panel assembly (20) adapted for use in a passenger compartment of a motor vehicle, comprising;

a skin member (24) secured to a support member (22) to define an enclosed volume therebetween; and inflator means (26) for supplying gas to cause the skin member to expand, the skin member mounted generally forward of the position of the knees of a seated occupant with the passenger compartment, the skin member partitioned by tether means for controlling the inflated shape of the skin member to receive a respective knee or lower leg portion, the tether means and the skin member cooperating so that the expanded shape of the skin member has an inflated center part and two inflated end parts, each end part and the center part linked by an inflatable, tethered section of lesser depth which creates a respective ualley therebetween for a respective knee or lower leg portion.

2. The trim panel assembly of claim 1 wherein the tether means comprises a tether (28) secured between the support member and the skin member.

3. The trim panel assembly of claim 2 wherein an end of the tether has a loop (52) extending through a slot (56) in the support member so as to be located external of the volume (30), wherein a securing member (60) is inserted through the loop to secure the end of the tether relative to the slot in the support member.

4. The trim panel assembly of claim 1 wherein the inflator means has a nozzled end (32, 34) extending into the volume.

5. The trim panel assembly of claim 4 wherein the nozzled end of the inflator means includes a plurality of openings (34) positioned such that the gas is dispersed through the openings in a direction generally parallel to the support member.

6. The trim panel assembly of claim 1 further comprising cushioning material (70) disposed between the skin member (24) and the support member (22).

7. The trim panel assembly of claim 6 wherein the cushioning material is made from a porous foam material wherein the assembly further includes an inflator for providing inflation gas, the inflator located with the foam material and including a least one discharge port directing the flow of gas into and through the porous foam material.

8. The trim panel assembly of claim 1 further comprising an air bag (76) located in the sealed volume and in communication with the inflator means (26) such that gas supplied by the inflator inflates the air bag which causes the skin member to expand to form the gas-filled cushion.

9. A trim panel assembly (20), comprising:
 a support member (22);
 a pad material (70) having a porousity low enough for inflation gas to flow therethrough;
 an elastic skin (24) covering the pad material and attached to the periphery of the support member to form a sealed volume (30) between the elastic skin and the support member;
 a tether (28) having a first end secured to the elastic skin and a second end secured to the support member; and
 inflator means (26) for discharging gas into the sealed volume to expand the elastic skin and form a safety cushion shaped by the tether, the inflator means including a discharge nozzle within the pad material.

10. The trim panel assembly of claim 9 wherein the elastic skin is made from a thermoplastic urethane material.

11. The trim panel assembly of claim 9 wherein the inflator means includes a nozzle (32) in communication with the sealed volume, and wherein the inflator means disperses the gas through openings in the nozzle in a direction generally parallel to the support member.

* * * * *